United States Patent
Zhang

(10) Patent No.: US 7,899,441 B2
(45) Date of Patent: Mar. 1, 2011

(54) METHOD FOR RESOLVING AND ACCESSING SELECTED SERVICE IN WIRELESS LOCAL AREA NETWORK

(75) Inventor: Wenlin Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1259 days.

(21) Appl. No.: 11/260,866

(22) Filed: Oct. 27, 2005

(65) Prior Publication Data

US 2006/0111082 A1    May 25, 2006

Related U.S. Application Data

(63) Continuation of application No. PCT/CN2004/001191, filed on Oct. 20, 2004.

(30) Foreign Application Priority Data

Oct. 22, 2003  (CN) ............ 2003 1 0104527

(51) Int. Cl.
*H04M 1/66* (2006.01)
*H04W 40/00* (2009.01)
*H04W 4/00* (2009.01)
*H04W 12/00* (2009.01)

(52) U.S. Cl. ............ 455/411; 455/448; 455/432.1; 370/328; 709/227; 709/229; 713/168

(58) Field of Classification Search ............ 713/168; 709/227–229; 370/328; 455/410–411, 432.1, 455/448
See application file for complete search history.

(56) References Cited

U.S. PATENT DOCUMENTS 7,221,929 B2 *   5/2007   Lee et al. ............ 455/408

(Continued)

FOREIGN PATENT DOCUMENTS

JP    2003-218954 A    7/2003

(Continued)

OTHER PUBLICATIONS

3GPP; "3GPP TS 23.234 V2.0.0 (Sep. 2003)—3rd Generation Partnership Project; Technical Specification Group Services and System Aspects; 3GPP System to Wireless Local Area Network (WLAN) Interworking; System Description (Release 6)"; 3GPP, [Online] Sep. 2003; (XP002489050; Retrieved from the Internet; URL: http://www.3gpp.org/ftp/Specs/archive/23_series/23.234/23234-200.zip>; [retrieved on Jul. 21, 2008]; Section 7.8; Annex E.

(Continued)

*Primary Examiner* — Matthew Sams

(57) ABSTRACT

The present invention discloses a method for resolving and accessing a selected service in a Wireless Local Area Network (WLAN), wherein a service resolving unit is preconfigured for initial access, the method comprising: a WLAN user terminal sending a service establishing request to the service resolving unit; after receiving the service establishing request, the service resolving unit sending a service authentication and authorization request containing the user's subscription information to the service authentication authorization unit, which performs authentication and authorization to the requesting WLAN user terminal; then judging whether the authentication and authorization is successful, if yes, the service authentication authorization unit returning the address of the authorized destination device to the requesting WLAN user terminal so as to establish a service connection between the WLAN user terminal and the destination device; otherwise, the service authentication authorization unit returning the failure information of the service establishing request. With this method, the analytical access processing of the selected service can be simplified while the security and reliability of the network greatly enhanced.

16 Claims, 11 Drawing Sheets

U.S. PATENT DOCUMENTS

| | | | |
|---|---|---|---|
| 7,254,119 B2 * | 8/2007 | Jiang et al. | 370/328 |
| 2002/0174335 A1 * | 11/2002 | Zhang et al. | 713/168 |
| 2003/0039237 A1 * | 2/2003 | Forslow | 370/352 |
| 2003/0117986 A1 | 6/2003 | Thermond et al. | |
| 2003/0211843 A1 * | 11/2003 | Song et al. | 455/411 |
| 2004/0202145 A1 * | 10/2004 | Lundin | 370/349 |
| 2004/0248615 A1 * | 12/2004 | Purkayastha et al. | 455/552.1 |
| 2005/0007984 A1 * | 1/2005 | Shaheen et al. | 370/338 |
| 2005/0096072 A1 * | 5/2005 | Rahman et al. | 455/466 |

FOREIGN PATENT DOCUMENTS

| | | |
|---|---|---|
| JP | 2003258808 A | 9/2003 |
| WO | WO 03007571 A1 * | 1/2003 |
| WO | WO-03084255 A1 | 10/2003 |

OTHER PUBLICATIONS

Huawei, CMCC, Orange, HP, Ericsson, Telecomitalia, Telenor, Nortel, . . . ;"Tdoc S2-033453—W-APN resolution analysis"; 3GPP TSG-SA2#36; [Online]; Oct. 27, 2003;—Oct. 31, 2003; XP002489051; Bangkok, Thailand; Retrieved from the Internet: URL:http://www.3gpp.org/ftp/tsg_sa/WG2_Arch/TSGS2_35_Bangkok/tdocs/s2-033453.zip>; [retrieved on Jul. 21, 2008].

Supplementary European Search Report for European Application No. 04789850, dated Aug. 5, 2008.

Notice of Reasons for Rejection for Japanese Application No. 2006-535930, dated Sep. 18, 2008, with English translation thereof.

* cited by examiner

METHOD FOR RESOLVING AND ACCESSING SELECTED SERVICE IN WIRELESS LOCAL AREA NETWORK

CROSS-REFERENCE TO RELATED APPLICATIONS

This application is a continuation of International Application No. PCT/CN2004/001191 filed Oct. 20, 2004. This application claims the benefit of Chinese Patent Application No. 200310104527.0 filed Oct. 22, 2003. The disclosures of the above applications are incorporated herein by reference.

FIELD OF THE INVENTION

The present invention relates to service accessing technique, more particularly to a method for resolving and accessing services selected by users in Wireless Local Area Network (WLAN).

BACKGROUND OF THE INVENTION

As users' demands for an increasingly high rate of wireless access, there emerges the WLAN, which is able to provide high-rate wireless data access in a relatively small area. Various techniques have been used in WLAN, among which a technical standard with more applications is IEEE 802.11b. This standard involves the frequency band of 2.4 GHz with a data transmission rate up to 11 Mbps. Other technical standards involving the same frequency band include IEEE 802.11g and the Bluetooth, where the data transmission rate of IEEE 802.11g is up to 54 Mbps. There are other new standards such as IEEE 802.11a and ETSI BRAN Hiperlan2, which use the frequency band of 5 GHz with the transmission rate up to 54 Mbps as well.

Although there are various techniques for wireless access, most WLANs are utilized to transfer IP data packets. The specific WLAN access technique adopted by a wireless IP network is usually transparent to the upper IP layer. Such a network is usually configured with Access Points for providing wireless access to a user terminal and with controlling and connecting devices for implementing IP transmission.

Along with the rising and developing of WLAN, focus of research is shifting to the inter-working of WLAN with various mobile communications networks, such as GSM, CDMA, WCDMA, TD-SCDMA, and CDMA2000. In accordance with the 3GPP standards, a user terminal is able to connect to Internet and Intranet via the WLAN access network and also connect to a user's home network and visited networks of a 3GPP system via the WLAN access network. To be specific, when accessing locally, a WLAN user terminal will get connected to the 3GPP home network via the WLAN access network, as shown in FIG. 2; when roaming, it will get connected to the 3GPP visited network via the WLAN access network. Some entities of the 3GPP visited network are connected with corresponding entities of the 3GPP home network, for instance, the 3GPP Authentication, Authorization and Accounting (AAA) Proxy in the visited network is connected with the 3GPP AAA Server in the home network, the WLAN Access Gateway (WAG) in the visited network is connected with the Packet Data Gateway (PDG) in the home network, as shown in FIG. 1. FIG. 1 and FIG. 2 are the schematic diagrams illustrating the networking architectures of a WLAN inter-working with a 3GPP system with and without roaming facilities, respectively.

As shown in FIG. 1 and FIG. 2, a 3GPP system primarily comprises Home Subscriber Server (HSS)/Home Location Register (HLR), 3GPP AAA Server, 3GPP AAA Proxy, WAG, PDG, Offline Charging System and Online Charging System (OCS). User terminals, WLAN access network, and all the entities of the 3GPP system together constitute a 3GPP-WLAN inter-working network, which can be used as a WLAN service system. In this service system, 3GPP AAA Server is in charge of the authentication, authorization and accounting of a user, collecting the charging information sent from the WLAN access network and transferring the information to the charging system; PDG is in charge of the transmission of the user's data from the WLAN access network to the 3GPP network or other packet networks; and the charging system receives and records the subscribers' charging information transferred from the network. OCS instructs the network transmit the online charging information periodically in accordance with the expense state of the online charged subscribers and makes statistics and conducts control.

In the non-roaming case, when a WLAN user terminal desires to access directly the Internet/Intranet, the user terminal can access Internet/Intranet via WLAN access network after it passes authentication and authorization of AAA server (AS) via WLAN access network. If the WLAN user terminal desire to access services of 3GPP packet switching (PS) domain as well, it may further request the services of Scenario 3 from the 3GPP home network. That is, the WLAN user terminal initiates a authorization request for the services of Scenario 3 to the AS of the 3GPP home network, which will carry out service authentication and authorization for that request; if it succeeds, AS will send an access accept message to the user terminal and assign a corresponding PDG for the user terminal. When a tunnel is established between the user terminal and the assigned PDG, the user terminal will be able to access to the services of the 3GPP PS domain. Meanwhile, the offline charging system and OCS records the charging information in accordance with the user terminal's occupation of network resources. In the roaming case, when a WLAN user terminal desires to access directly the Internet/Intranet, it may make a request to the 3GPP home network by way of the 3GPP visited network for access to the Internet/Intranet. If the user terminal also desires to request the services of Scenario 3 to access the services of the 3GPP PS domain, the user terminal needs to initiate via the 3GPP visited network a service authorization process at the 3GPP home network. The authorization is carried out likewise between the user terminal and AS of the 3GPP home network. After the authorization succeeds, AS assigns the corresponding home PDG for the user terminal, then the user terminal will be able to access the services of 3GPP PS domain of the home network after it establishes a tunnel with the assigned PDG via the WAG of the 3GPP visited network.

At present, after a user selects an Access Point Name (APN) of a service, there are two implementing schemes to obtain the address of corresponding service providing unit according to the service name after authentication and authorization of the AAA server:

One scheme is: the user terminal directly obtains the address of final service providing unit, namely destination PDG address, through a public Domain Name Server (DNS), wherein the destination PDG is usually located in home network of current user terminal. In this case, user terminal sends a tunnel establishing request to the destination PDG, the PDG authenticates current user terminal on AAA server after receiving the request. If the authentication is successful, the destination PDG directly establishes a tunnel between itself and User Terminal (UE). Disadvantage of this scheme lies in: it is difficult for visited network to judge whether to allow the user to visit destination address and make control, so that illegal data may be transmitted among networks. Because inter-network traffic is usually long-distance traffic, transmission cost is pretty high and inter-network balance is required. Therefore, it's better to avoid transmitting unauthenticated information. In addition, in terms of security, if all PDGs in a network of an operator are exposed in DNS system and any Internet users can get them, there will be great potential trouble for network security.

The other scheme is: the user terminal obtains through by private DNS resolving the WAG which covers it currently and service authentication and authorization is performed through interaction between the WAG and AAA server. After the authorization is successful, the WAG obtains the address of final service providing unit from AAA server, namely address of PDG, and then current user terminal sends a tunnel establishing request to the destination PDG to establish a tunnel between UE and destination PDG. However, as a user's request is directly handled by WAG in this scheme, a WAG detecting mechanism, like DNS or DHCP, is needed to inquire and resolve WAG's address, accordingly new protocol needs to be added for interaction. Besides, since there is repeated interaction between PDG and AAA server for APN authentication and authorization, this scheme through WAG becomes more complicated. Moreover, there are much more WAGs than PDGs in a visited network. All this leads to a greater demand for WAG in the visited network, which has to provide sufficient WAGs so as to guarantee the service interaction. What's more, as a large number of WAGs in other networks will interact with AAA server, the core device in the home network, a great threat is posed for the security of AAA server, thus bringing difficulty to the roaming of services. Therefore, there are obvious disadvantages in the above two schemes, so it is difficult to put them into use. The main reason is that neither of the schemes adopts proper resolution strategy according to different capabilities of visited networks. In one scheme, the visited network is required to have strong capability, leading to problems like complicated network implementation and potential trouble for inter-network security, so that roaming scope is restricted. With the other scheme, although public DNS resolution is pretty easy, inter-network data cannot be effectively controlled and public DNS must be relied on, which brings potential security problem and consequently confines the application of this scheme.

SUMMARY OF THE INVENTION

Therefore, the main object of the present invention is to provide a method for resolving and accessing selected services in Wireless Local Area Network, to simplify the resolution and access processing by the network for a selected service, and meanwhile to greatly enhance network security and reliability.

To attain the above object, technical scheme of the present invention is implemented as follows:

A method for resolving and accessing selected services in WLAN, wherein a service resolving unit is pre-configured for initial access processing, the method comprising:

a. A WLAN user terminal sending a service establishing request to the said service resolving unit;

b. After receiving the service establishing request, the service resolving unit sending to service authentication authorization unit a service authentication and authorization request that comprises user subscription information extracted from the service establishing request, according to subscription information of the WLAN user terminal initiating the request, the service authentication authorization unit performing service authentication and authorization of the WLAN user terminal initiating the request;

c. The service authentication authorization unit judging whether authentication and authorization is successful, if yes, the service authentication authorization unit returning the addresses of destination devices authorized to handle the selected services to the WLAN user terminal initiating the request via the service resolving unit, the WLAN user terminal establishing a service connection with the said destination devices; otherwise, the service authentication authorization unit returning failure information of the service establishing request.

The said WLAN user terminal sending a request to the service resolving unit in step a comprises: the WLAN user terminal sending a request to the service resolving unit according to the local network address obtained through private DNS resolution or according to a public IP address; or the WLAN user terminal sending a request to the service resolving unit according to the public IP address obtained through public network DNS resolution; or the WLAN user terminal sending a request to the service resolving unit according to a preset IP address or any address in an address list; or the WLAN user terminal sending a request to the service resolving unit according to the last visited IP address.

The said judging whether authentication and authorization is successful in step c further comprises: judging whether the routing between current authorized destination device and the WLAN access gateway to which the requesting WLAN user terminal belongs is opened to the requesting WLAN user terminal, if the routing is opened, the service authentication and authorization is successful; otherwise, the service authentication authorization unit sending an open route notification to the WLAN access gateway to which the requesting WLAN user terminal belongs to instruct the WLAN access gateway to open the route between the authorized destination device and itself, then judging whether the route is successfully opened, if yes, the service authentication and authorization is successful, otherwise unsuccessful.

The said service resolving unit is the destination device authorized to process the selected services, then said step c comprises: after the service authentication authorization unit sending the destination device address to the service resolving unit, the service resolving unit directly sending service establish response to the requesting WLAN user terminal, and starting a process of establishing service connection with the requesting WLAN user terminal.

The said process of establishing a service connection between the WLAN user terminal and the destination device in step c further comprises: after receiving the address of destination device authorized to process the selected service, the requesting device sending a service establishing request to the destination device once again; after receiving the service establishing request, the destination device performing authentication and authorization to the current requesting WLAN user terminal through interaction with the service authentication authorization unit, if the authorization is successful, the destination device establishing a service connection with the requesting WLAN user terminal.

In step c, while returning address of the destination device authorized to process the selected service to the requesting WLAN user terminal, the service authentication authorization unit sending a service authorization notification that carries information of the requesting WLAN user terminal to the destination device. The process of establishing a service connection between the WLAN user terminal and the destination device in step c further comprising: after receiving the address of destination device authorized to process the selected service, the requesting WLAN user terminal sending a service establishing request to the destination device once again; after receiving the service establishing request, the destination device performing authentication and authorization to the requesting WLAN user terminal according to the information in the service authorization notification, if the authorization is successful, establishing a service connection with current requesting WLAN user terminal.

The said user subscription information at least comprises: user identity of the requesting WLAN user terminal and service name of the selected service that the WLAN user terminal requests to access. The service establishing request is included in a tunnel establish request signaling provided by the standard. The service resolving unit is configured inside the visited network or inside the home network of the requesting WLAN user terminal.

The service authentication authorization unit is an Authentication Authorization and Accounting (AAA) server. The service authentication authorization unit is a 3GPP AAA Server. The destination device authorized to process the selected service is a PDG device specified by 3GPP standards or a General Package Radio Service (GPRS) Gateway Support Node (GGSN).

The method further comprises: after the selected service is successfully accessed, the requesting WLAN user terminal storing corresponding relation between the selected service name and the address of destination device authorized to process the selected service.

The method further comprises: after the selected service is successfully accessed, the requesting WLAN user terminal storing corresponding relation between the selected service name and the service resolving unit.

The method further comprises: after current access to selected service is over, closing the route between the WLAN access gateway device and the authorized destination device, wherein the route is provided for the requesting WLAN user terminal.

In the above scheme, the WLAN access gateway device is a WLAN Access Gateway (WAG).

The user identity is Network Access Identity (NAI) or user IP or International Mobile Subscriber Identity (IMSI) or TEMPID or Session Initialization Protocol-Uniform Resource Locator Identity (SIP-URL) of the requesting WLAN user terminal.

Step c further comprises: while returning failure information to the requesting WLAN user terminal, indicating corresponding error information to the requesting WLAN user terminal.

In accordance with the method for resolving and accessing selected service in WLAN provided by the present invention, one or more than one service resolving unit specially used for initial access processing is configured, and user terminals will send all service access requests to the service resolving unit, which controls the subsequent procedures of authentication, authorization and service connection establishment. This method has the following advantages and features:

1) The present invention can furthest implement resolution and access procedure of the selected WLAN service according to the capabilities and structure of a practical network.

2) When using a public DNS, there is only a few devices acting as service resolving unit, like PDG, whose addresses is to be found in the public DNS while other common service access devices that provide services, e.g. PDG, do not have to be disclosed in the public DNS, so security of gateway devices that provide services, e.g. PDG, is guaranteed, preventing the users without authentication or authorization from directly visited the gateway device that provide services, e.g. PDG. As for service resolving units that can be found in public DNS, the security and reliability thereof can be improved by enhancing security protection and the processing capability thereof.

3) For a visited network with strong capabilities and allowed to visit home network user data and/or allowed to interact with home network AAA server, resolution and authorization operations can be performed by devices in visited networks; for a visited network with weak capabilities, resolution and authorization operations can be forwarded to home network through specified route and destination address, so as to avoid roaming scope restriction. However, as far as the user terminal is concerned, the above-mentioned two approaches are both invisible and with completely the same interactive modes, which can guarantee simplicity and consistency of the user terminal.

4) VPLMN/WLAN operators decide whether to adopt private or public DNS resolution method to obtain the address of the service resolving unit, which may be located in VPLMN or HPLMN without the need of differentiating between PDG and WAG.

5) The requesting WLAN user terminal and the destination device make interaction by means of existing signaling for establishing End-to-End (E2E) tunnel so as to avoid adding new interactive protocols. The service resolving unit interacts with AAA server to perform authentication and authorization of the user terminal, the authorization result of which will lead to the actual PDG for processing the service. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The rationale of the present invention is: adopting two-step resolution, that is, presetting one or more than one service resolving unit used for initial access processing. These service resolving units receive users' requests, perform authentication and authorization with a service authorization unit, and then return to the requesting user terminal the address of the device authorized by the service authorization unit to process the selected services, wherein the authorized device can also provide some simple services. That is to say, User terminals will send all the service access requests to the service resolving units, which control subsequent operations like authentication, authorization and address returning.

The service resolving unit can be set inside the home network or visited network of the requesting user terminal, which is determined by operator of the visited network according to predefined roaming agreement. The service resolving unit can be located in WAG or PDG. The service authentication authorization unit can be an AAA server or a 3GPP AAA Server in a 3G system. The device authorized to process selected services can be PDG, GGSN or other gateway devices for service connection.

Figure 4:
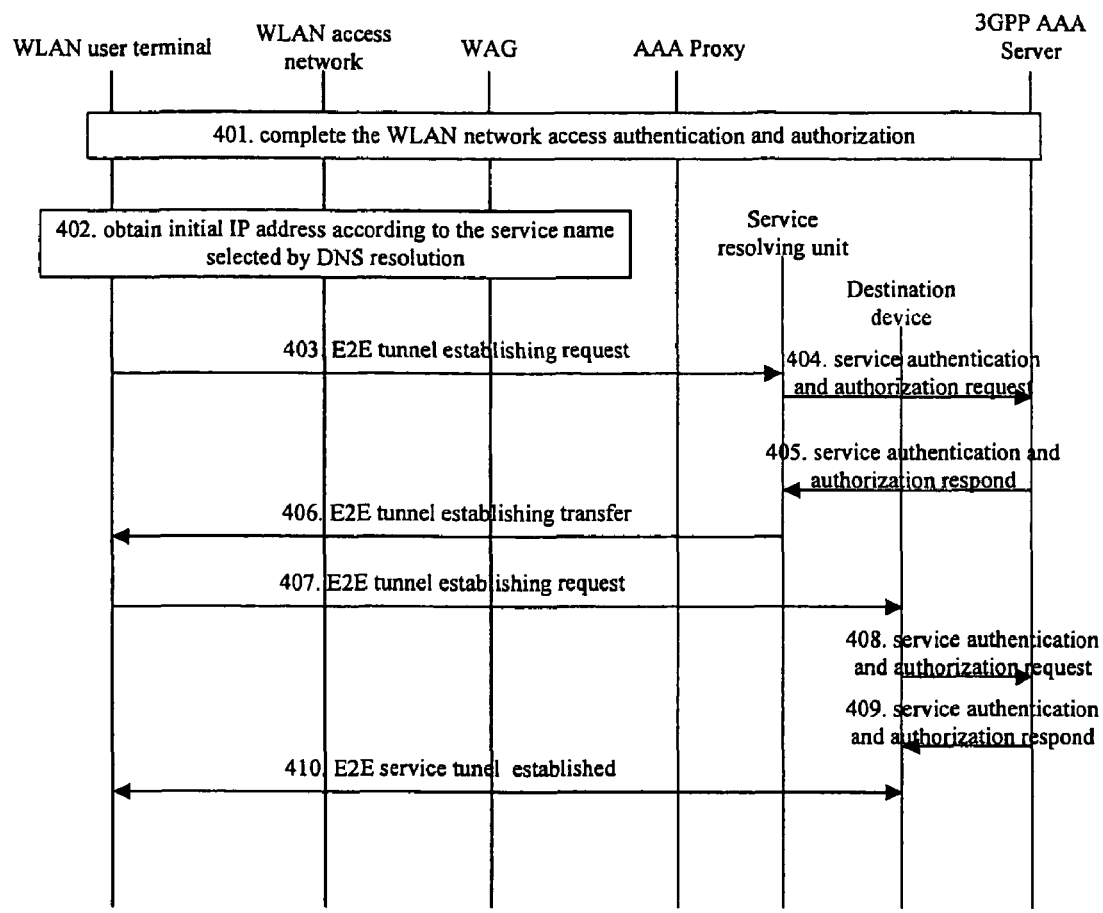
FIG. 4 is a flowchart illustrating the basic processing in accordance with the present invention.

In the present invention, one or more than one service resolving unit is to be set in advance. Multi service resolving units can be differentiated based on the differences among services to be processed. All service resolving units are connected with the service authentication authorization unit. FIG. 4 is a flowchart illustrating the basic processing in accordance with the present invention. As shown in FIG. 4, the access processing of selected services in accordance with the present invention mainly comprises the flowing steps:

Step 401: when a WLAN user terminal requests to access 3GPP-WLAN inter-working network through WLAN, the WLAN user terminal or the network initiates an access authentication procedure and the network side performs authentication to this WLAN user terminal. Specifically speaking, the access authentication authorization unit at the network side performs legality authentication between the user terminal and the network through an access control unit. Here, the access control unit can be Access Controller (AC) in WLAN access network or WAG in operational network or combination of the two; the access authentication authorization unit can be a 3GPP AAA Server.

Figure 1:
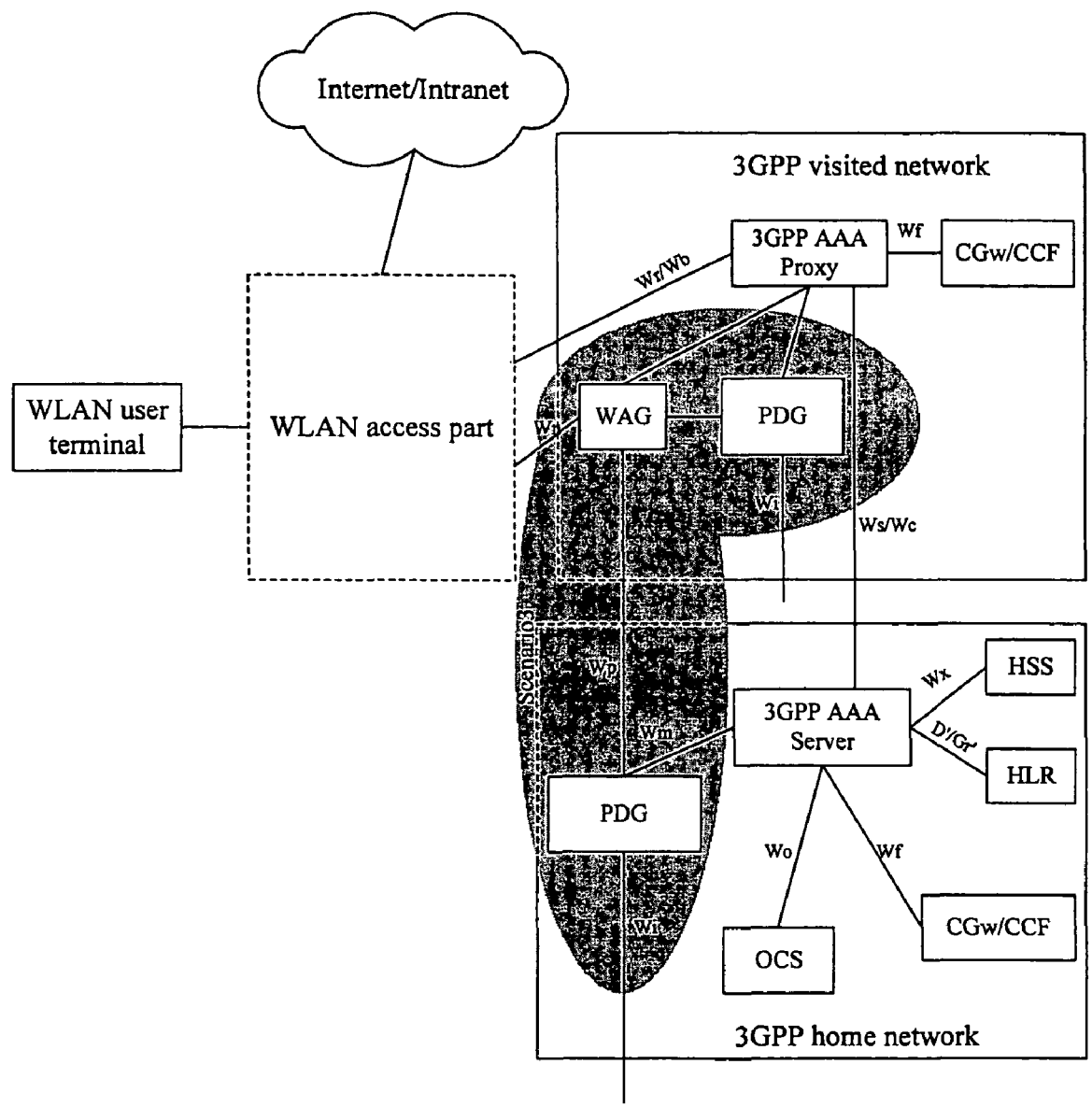
FIG. 1 is a schematic diagram illustrating network structure of inter-working WLAN system and 3GPP system in the roaming case.
Figure 2:
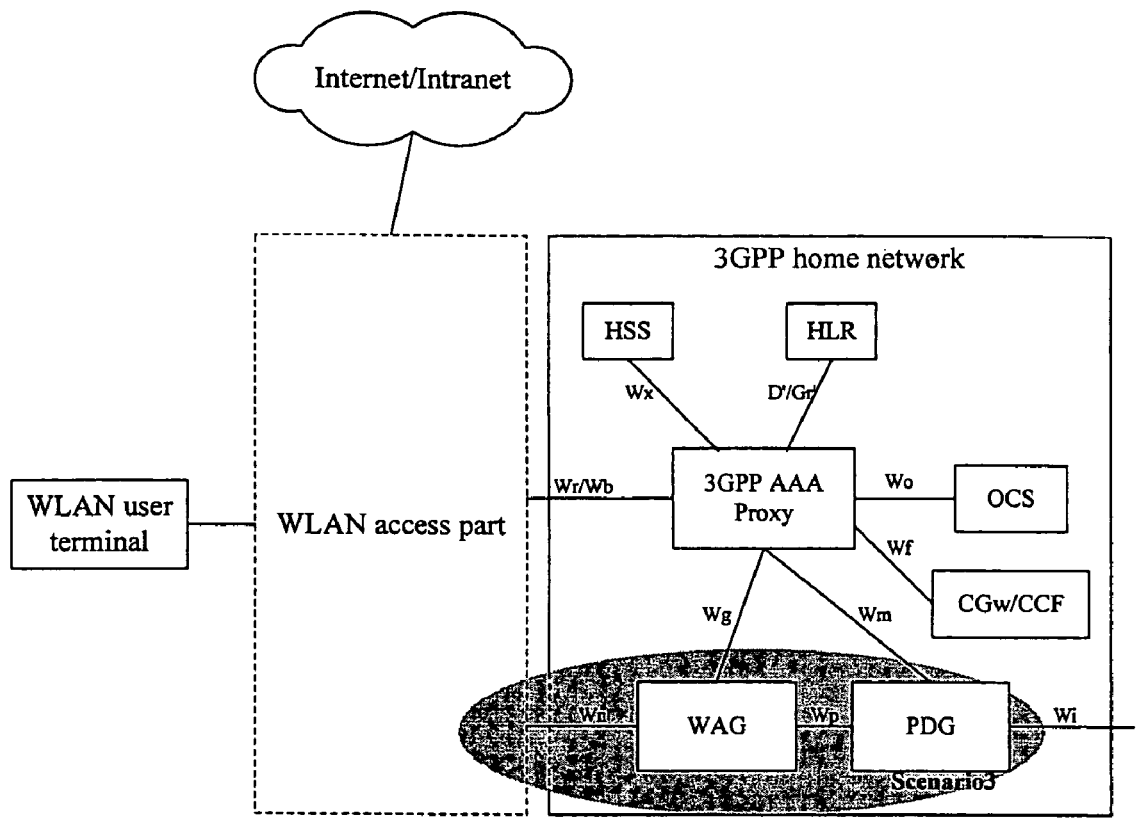
FIG. 2 is a schematic diagram illustrating network structure of inter-working WLAN system and 3GPP system in the non-roaming case.
Figure 3:
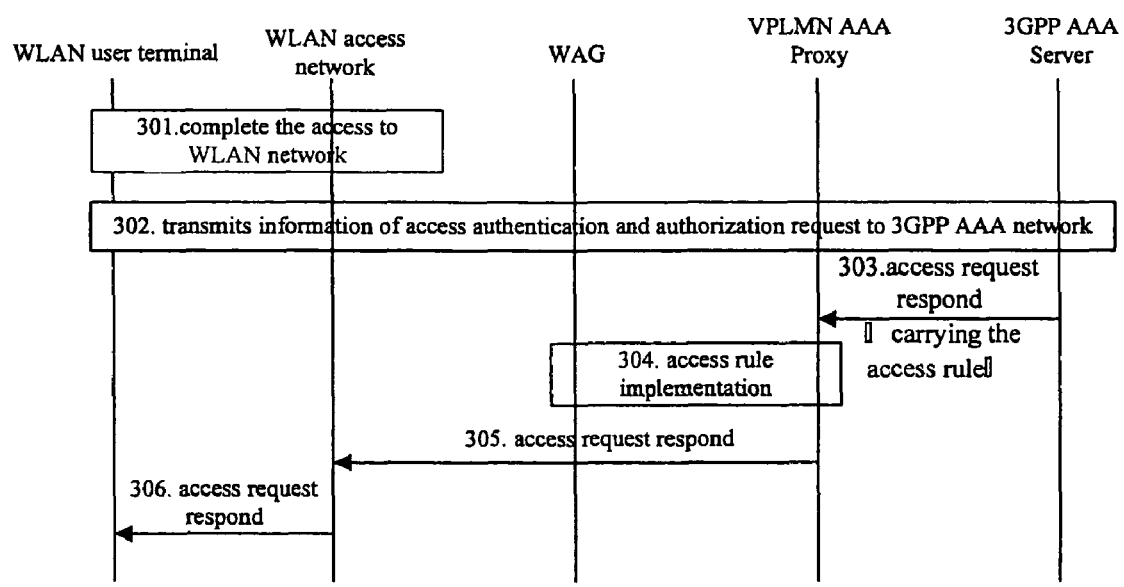
FIG. 3 is a flowchart illustrating access authorization procedure.

As shown in step 301~step 306 in FIG. 3, the access authentication and authorization procedure between WLAN user terminal and 3GPP AAA Server comprises: WLAN user terminal transmitting authentication information needed for authentication to the access authentication authorization unit through the access control unit; after receiving relevant information of the user terminal, the access authentication authorization unit performing access authentication in itself, if the authentication is successful, authorizing the user's access scope according to the subscription information and continuing with subsequent operations; otherwise, notifying the user terminal about failure of the access authentication and ending the current access authorization procedure.

The said subscription information concerning access scope means that the user terminal has to be authorized for access when initially accessing WLAN. At this moment, it will be determined whether the user data can be allowed to pass WAG. After the access is authorized, the user terminal can access the Internet and Local Area Network but cannot access 3GPP packet services, i.e. cannot access various 3G network services provided through PDG.

If a certain terminal is able to access a 3G service and has subscribed to this service, the PDG providing the service may still be closed to this user terminal, therefore routing the user data to the PDG will be forbidden at WAG. But in order to let the request of this user terminal pass WAG, this user terminal will be authorized at WAG to visit the initial resolution device. Obviously, the route to the PDG providing the service can be opened to the user terminal during access authorization so that the signaling of the user terminal's request can pass, but it is still needed to perform service authorization by interacting with the PDG during service access procedure. Some low-cost user terminals, which has not subscribed to the services requiring interaction with a 3G network, will only be allowed to directly access the Internet through WLAN, but permanently forbidden to access such a 3G core-network device as PDG through WLAN, then any data of this kind of users will be forbidden to pass at WAG.

Step 402: after passing the access authentication, WLAN user terminal, by interacting with a public or private DNS, obtains the IP address of the service resolving unit according to the service name of the selected service.

Here, there are many ways for a WLAN user terminal to obtain the IP address of the service resolving unit: obtaining the local network address or public IP address according to the resolution in a private DNS; or obtaining the public IP address according to resolution in a public DNS; or obtaining the IP address of the service resolving unit according to a preconfigured IP address or any address in the address list; or obtaining the IP address of the service resolving unit according to the IP address obtained by resolution performed in the last access.

Step 403: according to the address obtained in step 402, the requesting WLAN user terminal sends a service establishing request to the service resolving unit. In this embodiment, the End-to-End tunnel establish request in the existing standard signaling can be adopted to bear this service establishing request, or the service establishing request can be made by signaling independently set. In this embodiment, the service resolving unit is an independent device.

Relevant subscription information of current WLAN user terminal carried in this request mainly comprises: user identity of current WLAN user terminal and name of service selected by current WLAN user terminal, wherein the user identity can be Network Access Identity (NAI), user IP, International Mobile Subscriber Identity (IMSI), TEMP ID or Session Initialization Protocol-Uniform Resource Locator Identity (SIP-URL). In this embodiment, the selected services may comprise short message service, multimedia short message service, location service, IP Multimedia Subsystem (IMS) services, and so on.

Step 404~step 405: after receiving the service establishing request, the service resolving unit sends a service authentication and authorization request to the service authentication authorization unit, wherein the request carries the user's subscription information. The service authentication authorization unit performs authentication and authorization to the requesting WLAN user terminal according to the received user's subscription information and then returns a service authentication and authorization response to the service resolving unit, wherein the response carries the result of authentication and authorization. In this embodiment, the service authentication authorization unit is a 3GPP AAA Server.

If the authentication and authorization is successful, the service authentication authorization unit will return the address of the device authorized to process selected services and the name of the authorized service to the service resolving unit; if unsuccessful, the service authentication authorization unit will return failure information to the requesting WLAN user terminal by way of service resolving unit and end the current access procedure. While returning failure information, the service resolving unit can provide the corresponding error information for WLAN user terminal. The subsequent steps are described by taking example of successful authentication and authorization.

While the said service authentication authorization unit authenticates the WLAN user terminal, 3GPP AAA Server will try to identify the requesting WLAN user terminal, if the identification is successful, it will be checked whether the requested service matches the service subscription information thereof, if they do not match, return failure information directly or return the information of a possible substitute service, for instance, replacing multimedia short message service by short message service. In this case, if the user terminal accepts the new substitute service, subsequent operations will be executed; otherwise, current procedure will be ended. If the identification is unsuccessful, user identification failure information will be directly returned and new procedures like user identity re-synchronization or re-authentication will be initiated.

Step 406: after receiving the address of destination device and authorized service names, the service resolving unit will forward the received information to the requesting WLAN user terminal. In this embodiment, the existing standard End-to-End tunnel establishing transfer signaling is adopted to transmit information like the address of destination device and authorized service names.

Step 407: after receiving the address of destination device, the requesting WLAN user terminal sends a service establishing request to the destination device once again according to the received address thereof to request for establishing service connection. In this embodiment, this service establishing request can be borne by existing standard End-to-End tunnel establishing transfer signaling.

Step 408~409: after the destination device receives the service establishing request, the service authentication authorization unit will authenticate the requesting WLAN user terminal. Because the destination device does not know that the requesting WLAN has passed the authentication, the requesting WLAN user terminal will be processed as a terminal initiating a new request.

Step 410: after the authentication is successful, the destination device will return a service establish response and interact with the requesting WLAN user terminal to establish a service tunnel. Since this requesting WLAN user terminal has passed an authentication, it can pass this authentication usually. Here, standard End-to-End tunnel establish interactive procedure can be adopted to implement the interactive procedure of establishing service tunnel.

Usually, data transmission between the destination device authorized by the service authentication authorization unit to process selected services and the intermediate route control device, such as WAG, is configured as enabled in advance. In another word, the address of destination device is an address allowed to route via the WAG, namely, there will be an open route between the WAG and destination device such that they can interact with each other. Specifically speaking, data of the requesting user terminal are allowed to arrive at the authorized destination device via WAG. There are two schemes to implement configuration in advance: The first scheme is that, the allowed address scope is sent to the devices like WAG during access authorization, for instance, a certain IP address may be opened for all subscribers whose home network operator is CMCC, allowing them to visit the network; or all devices are only allowed to access a certain device in the local network; the other scheme is that, after the access, AAA server issues to the relevant visited networks the instruction about the opened IP addresses in the local network, or the IP addresses that every subscriber is allowed to visit.

Figure 5:
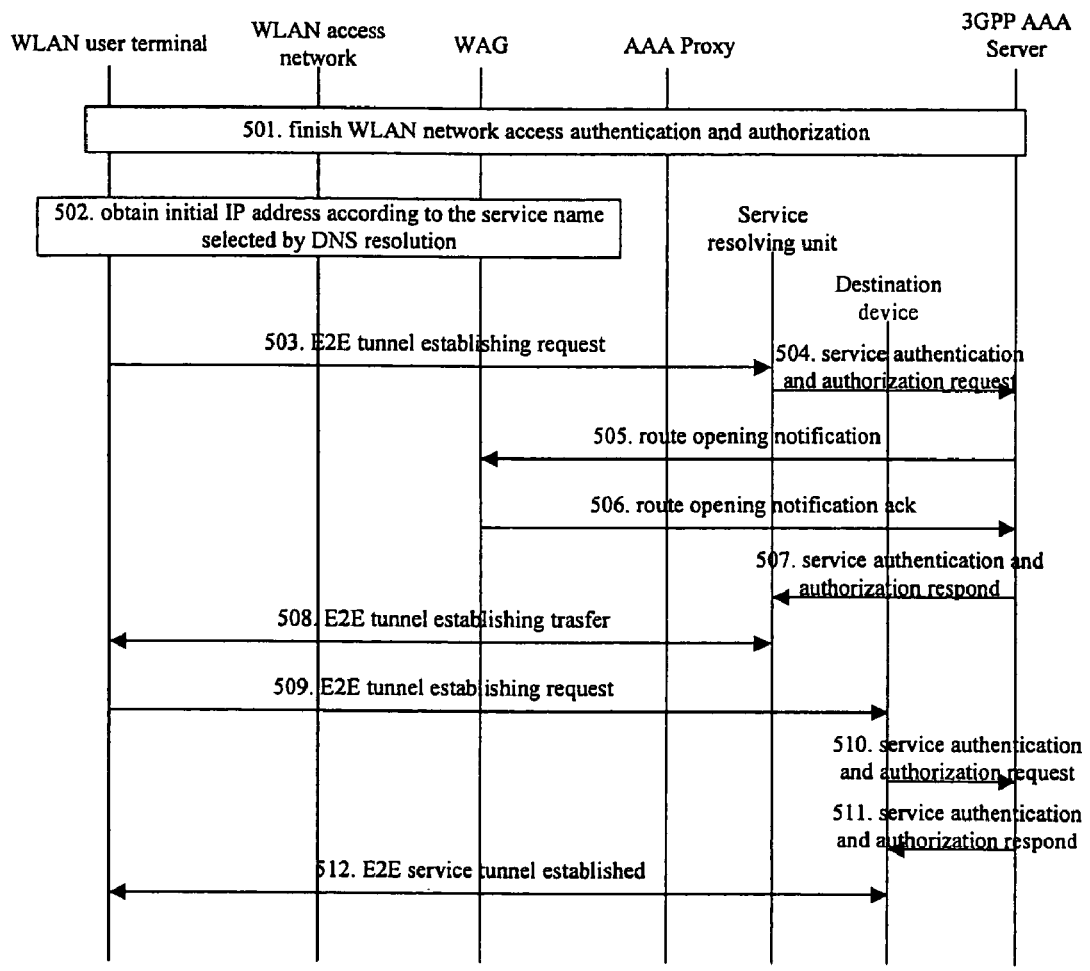
FIG. 5 is a flowchart of the processing in the first embodiment according to the method of the present invention.

However, sometimes there is no allowed route preset between the destination device and intermediate route control device. In this case, after having determined the authorized destination device, the service authentication authorization unit will check its own record and judge whether there is an authorization allowed route between the WAG to which requesting WLAN user terminal currently belongs and the destination device, wherein this judgment is based on whether the service authentication authorization unit has previously sent relevant authorization of route opening or closing to WAG or AAA proxy, if not yet, it is needed to notify the relevant WAG. As shown in FIG. 5, this embodiment comprises the following steps:

Step 501~504: completely the same as step 401~404. In this embodiment, the intermediate control device is WAG, and the service authentication authorization unit is 3GPP AAA Server.

Step 505~506: after determining the authorized destination device, 3GPP AAA Server sends an open route notification to the WAG to which requesting WLAN user terminal belongs, wherein the notification carries the information of the destination device; after receiving the open route notification, WAG will open corresponding routes according to the address of the destination device and then return an open route notification acknowledgment to 3GPP AAA Server.

Obviously, after receiving the open route notification, WAG may judge whether it is allowed to open the corresponding routes, if not allowed or the route opening fails due to other reasons, the returned open route notification acknowledgment will carry failure information. Meanwhile, current access procedure for the selected service will be ended.

Step 507~512: completely the same as step 405~410.

In case that a route is successfully opened, WAG can close the opened route after access of the selected service is ended.

Figure 6:
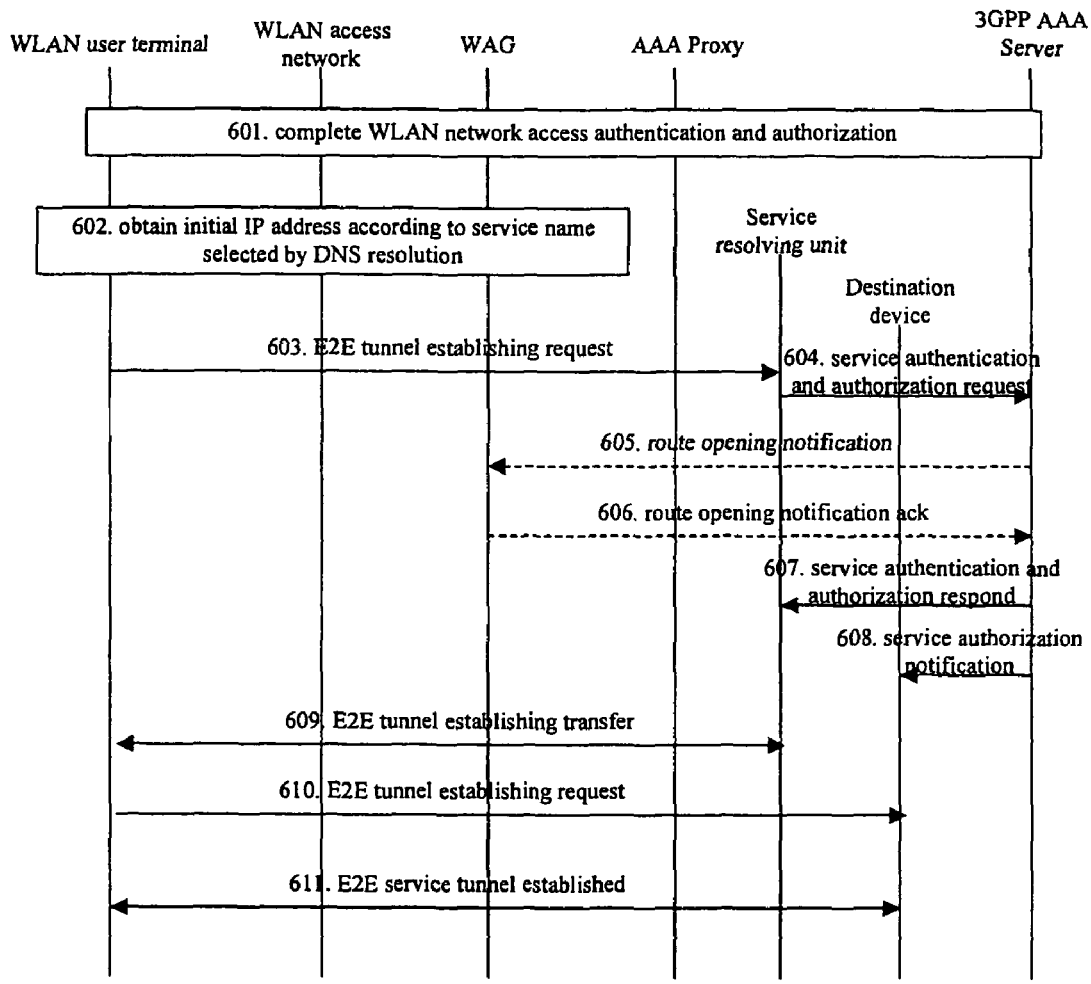
FIG. 6 is a flowchart of the processing in the second embodiment according to the method of the present invention.

In terms of the scheme shown in FIG. 4, after determining the destination device to process the selected service, the service authentication authorization unit, while sending service authentication and authorization response to the service resolving unit, sends a service authorization notification to the destination device to notify the device that it has been authorized to process a certain selected service requested by a certain WLAN user terminal. In this way, re-authentication procedure in step 408 and 409 can be skipped. The specific process is as shown in FIG. 6, comprising the following steps:

Step 601~604: completely the same as step 401~404. In this embodiment, the intermediate route control device is WAG and the service authentication authorization unit is 3GPP AAA Server.

Step 605~606: completely the same as step 505~506, but these two steps can be skipped. In case that steps 605 and 606 are included, the embodiment shown in FIG. 5 can also adopt the scheme of sending authorization notification to the destination device.

Step 607: completely the same as step 405.

Step 608: after determining the destination device authorized to process selected services, 3GPP AAA Server, while sending service authentication and authorization response to the service resolving unit, sends a service authorization notification to the destination device.

Step 609~611: the same as steps 406~407 and step 410, respectively. Since the destination device has learned in advance which user terminal sends the request as well as the request is for which service, after receiving the End-to-End tunnel establish request from the user terminal, the destination device will only compare the pre-received authorization notification with this received request, if they are from the same user terminal and are the same service, service connection can be directly established without making authentication again.

Figure 7:
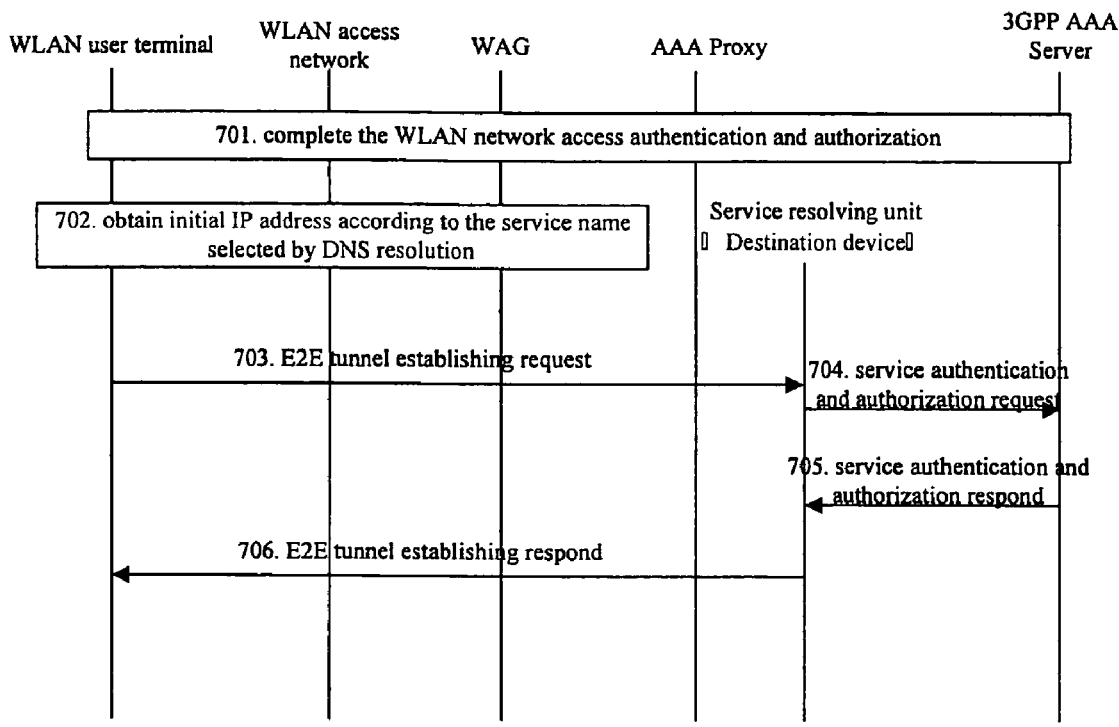
FIG. 7 is a flowchart of the processing in the third embodiment according to the method of the present invention.

In this invention, the service resolving unit may act as the destination device. In this case, the corresponding procedure is as shown in FIG. 7, comprising the following steps:

Step 701~704: completely the same as step 401~404. In this embodiment, the intermediate route control device is WAG and the service authentication authorization unit is 3GPP AAA Server.

Step 705: after determining the destination device authorized to process selected services, 3GPP AAA Server sends service authentication and authorization response to the service resolving unit, indicating that this service resolving unit has been authorized as the destination device to process the service selected by the current user terminal.

Step 706: after receiving the service authentication and authorization response, the service resolving unit directly responds to the establishment of a service connection so that the WLAN user terminal performs subsequent interaction directly to establish the service connection without the need of sending an End-to-End tunnel establish request to the service resolving unit according to the received address.

Figure 8:
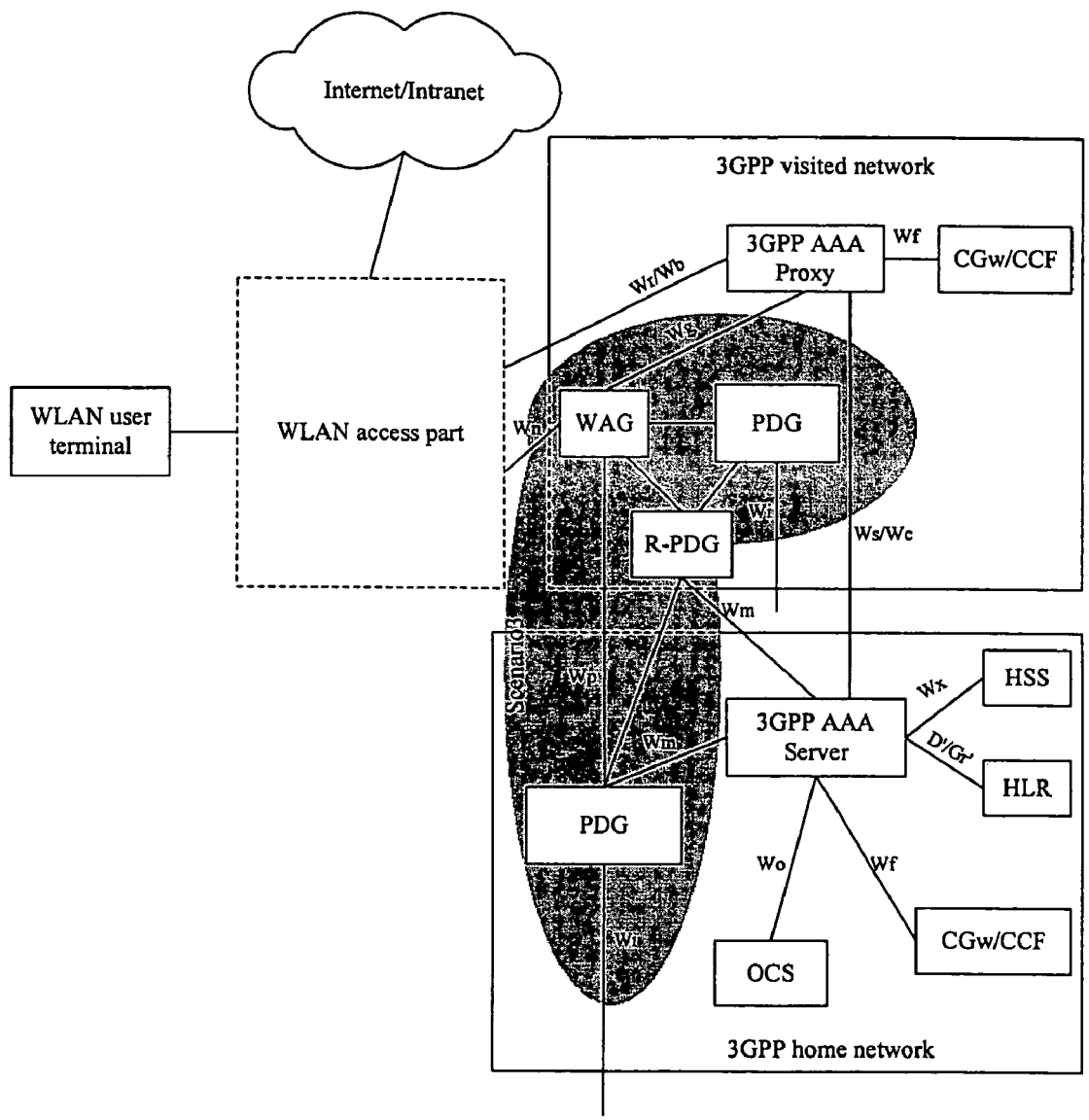
FIG. 8 is a flowchart of the processing in the forth embodiment according to the method of the present invention.

There are two ways of setting the service resolving unit: setting the service resolving unit inside a visited network or a home network. Procedure of resolution implemented by a service resolving unit in a visited network is as follows:

FIG. 8 illustrates an embodiment where the service resolving unit is set inside a visited network. As shown in FIG. 8, in this embodiment, a PDG in the visited network is taken as the service resolving unit, which can be called R-PDG. An IP address should be allocated by the visited network. The address of the service resolving unit that user terminal accesses is placed in a private DNS system, and an R-PDG address of the visited network can be obtained by resolving any service name. During access authorization this R-PDG address will be allowed to be accessed through WAG.

Figure 9:
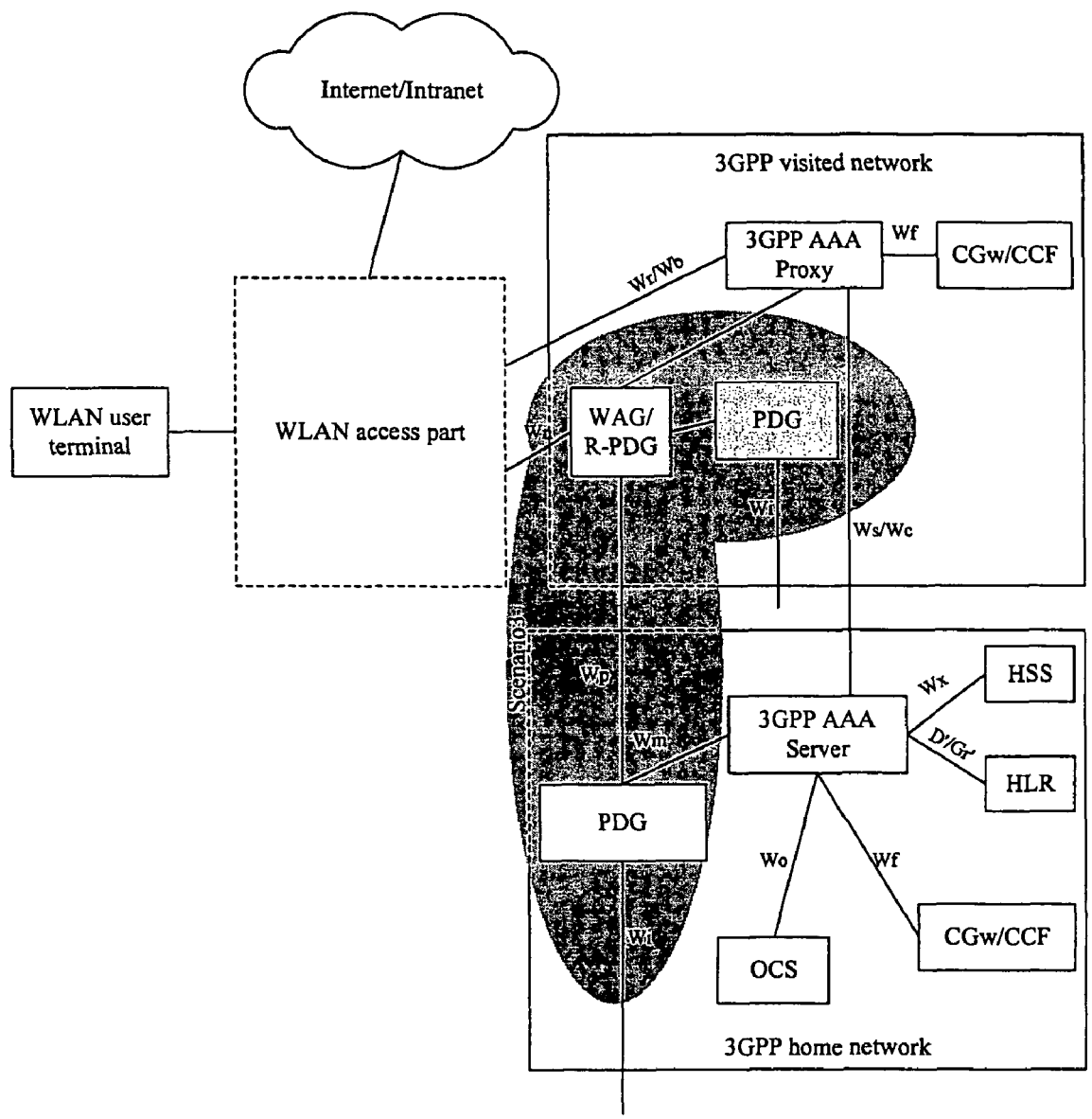
FIG. 9 is a flowchart of the processing in the fifth embodiment according to the method of the present invention.

FIG. 9 illustrates another embodiment when the service resolving unit is set inside the visited network. As shown in FIG. 9, in this embodiment, a WAG in the visited network acts as the service resolving unit. The visited network takes this WAG address as the initial resolution result of any user service, and the WAG should be able to interact with 3GPP AAA Server to perform service authentication and authorization while the signaling can be transmitted through AAA proxy. In case that the WAG is unable to interact with 3GPP AAA Server, the WAG acting as the service resolving unit can be taken as an R-PDG, wherein the network structure thereof is essentially the same as that shown in FIG. 8. As a result, there is the case when the two schemes as shown in FIGS. 8 and 9 co-exist in merged applications.

Figure 10:
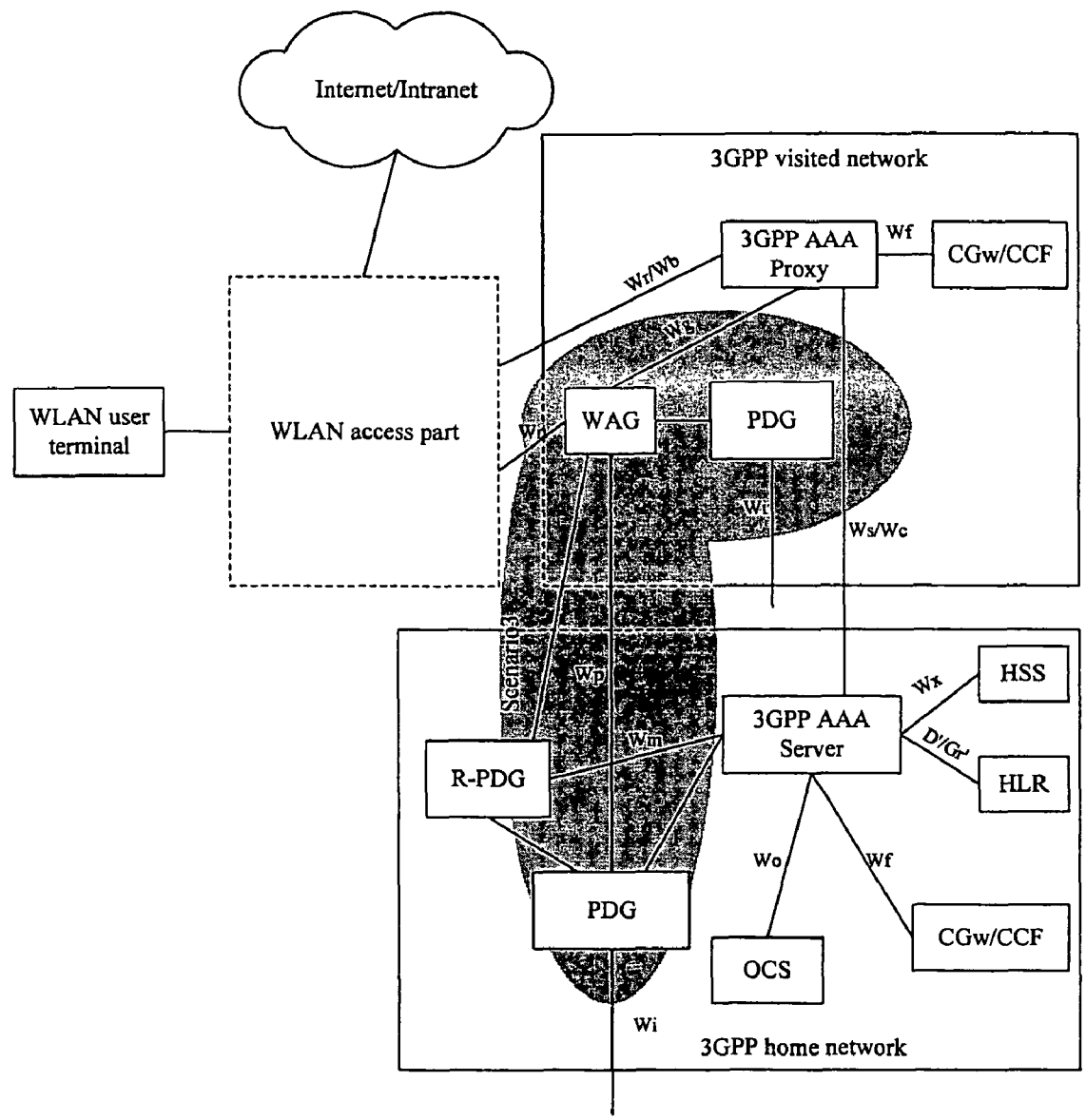
FIG. 10 is a flowchart of the processing in the sixth embodiment according to the method of the present invention.

Procedure of resolution implemented by the service resolving unit in the home network comprises the following steps:

FIG. 10 illustrates an embodiment when the service resolving unit is set inside a home network. As shown in FIG. 10, in the present embodiment, a PDG in the home network acts as the service resolving unit, which can be called R-PDG. When access authorization is required, the access rule sent by home network is implemented to allow users of the home network to route to an address or address segment of the R-PDG that can be taken as a service resolving unit.

Figure 11:
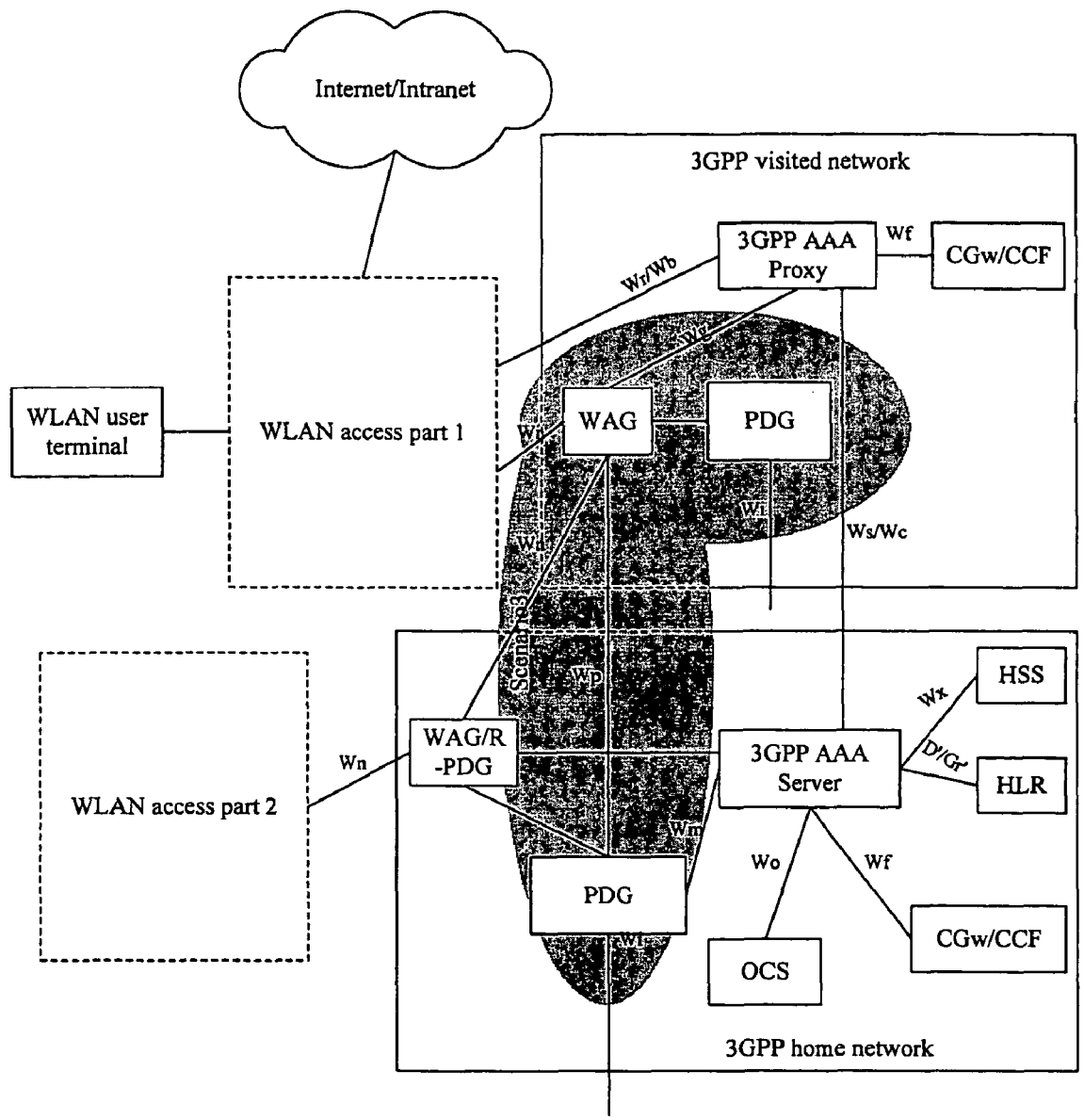
FIG. 11 is a flowchart of the processing in the seventh embodiment according to the method of the present invention.

FIG. 11 illustrates another embodiment when the service resolving unit is set inside home network. As shown in FIG. 11, in the present embodiment, WAGs in the home network act as the service resolving unit. These WAGs should be able to interact with 3GPP AAA Server to perform service authentication and authorization. When the user is covered by the home network, the procedure hereby is the same as that of the embodiment shown in FIG. 9. When the user is roaming, these WAGs are equivalent to the R-PDGs in the embodiment shown in FIG. 10, wherein the home network will, as prearranged or dynamically, notify the visited network about these addresses. When resolving a service request of the user terminal by DNS, the visited network directly notifies the user terminal about the addresses of these R-PDGs as DNS resolution results, in this way, the user terminal can obtain the addresses of service resolving units in the home network.

The above mentioned interaction procedures for resolution and access of a selected service can be applied in any combination in practical networks. In terms of a home network, this capability can be easily provided by using PDG as the service resolving unit, so can it by using WAG, both will attain the object of centralized management, but the latter will cost more than the former. Therefore, ordinary roaming partners are only required to be able to return the requested route obtained through initial resolution of DNS mechanism to some devices allowed by the home network.

In the above mentioned different embodiments, in case of services that are successfully accessed, the requesting WLAN user terminal can store the service names of the selected services and addresses of the corresponding destination devices so that the stored information can be used when establishing services once again. For instance, when establishing a service once again, if the service name is the same as the successfully accessed one and the stored association is still available, or if it is determined according to the special rules that the stored association can be tried, then the user terminal can directly send a service connection establish request to the stored address of the destination device that has once been authorized, and perform End-to-End (E2E) tunnel establishing to leave out the resolution procedure and access directly. Of course, if the stored address of destination device can not be reached or is rejected, resolution has to be performed once again.

Likewise, successfully accessed services mean that the service resolving unit succeeds in resolution, thus the requesting WLAN user terminal can store the service names of the selected services and addresses of corresponding destination devices such that the stored information can be used when establishing services once again. For instance, when establishing a service once again, if the service name is the same as the successfully accessed one and the stored association is still available, or if it is determined according to the special rules that the stored association can be tried, the user terminal can directly send a service establishing request to the stored address of service resolving unit to skip initial resolution, namely, procedure of finding the service resolving unit is the procedure of obtaining the address of the service resolving unit by DNS resolution. Of course, if the stored address of the service resolving unit can not be reached or is rejected, resolution has to be performed once again.

In the above scheme, the service resolving unit can also act as the service authentication authorization unit at the same time, or the service resolving unit and service authentication authorization unit are implemented by the same device. In this case, the authentication and authorization process can be implemented directly by the service resolving unit. Specifically speaking, after receiving a tunnel establish request, the service resolving unit extracts the user identity of the WLAN user terminal and the name of the service that the WLAN user terminal requests to access; meanwhile, the service resolving unit obtains the subscription information of the requesting WLAN user terminal from HSS/HLR according to the user identity, and then compares the obtained subscription information with the extracted information, if they match, the authentication is successful; otherwise, the authentication is unsuccessful.

The above description only shows preferable embodiments of the present invention, and is not used to confine the protection scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for resolving and accessing a selected service in a cellular Wireless Local Area Network (WLAN) interworking network, the method comprising the steps of:
   a. configuring a service resolving unit in the cellular network for initial access processing; receiving, by a service authentication authorization unit in the cellular network, a service authentication and authorization request from the service resolving unit; wherein the authentication and authorization request contains subscription information extracted by the service resolving unit from a first service establishing request sent by a user terminal in the WLAN;
   b. performing, by the service authentication authorization unit, service authentication and authorization to the user terminal according to the subscription information;
   c. determining, by the service authentication authorization unit, whether the authentication and authorization is successful, if the authentication and authorization is successful, returning, by the service authentication authorization unit, via the service resolving unit, an address of a destination device authorized to process the selected service to the user terminal, the address is used to establish a service connection between the user terminal and the destination device; if the authentication and authorization fails, returning, by the service authentication authorization unit, failure information to the user terminal via the service resolving unit;
   while returning the address of the destination device authorized to process the selected service to the user terminal, the service authentication authorization unit sending a service authorization notification that carries information of the user terminal to the destination device; the process of establishing a service connection between the user terminal and the destination device in step c comprises: the user terminal sending a second service establishing request to the destination device; after receiving the second service establishing request, the destination device performing authentication and authorization to the user terminal according to the information in the service authorization notification, if the authentication is successful, the destination device establishing the service connection with the user terminal;

wherein the determining whether the authentication and authorization is successful in step c comprises:
   judging determining, by the service authentication authorization unit, whether a route between the current authorized destination device and a WLAN access gateway device serving the WLAN user terminal that initiates the request is opened to the user terminal, if the route is opened, the service authentication and authorization is successful; otherwise, sending, by the service authentication authorization unit, an open route notification to the WLAN access gateway device to instruct the WLAN access gateway device to open the route to the authorized destination device; then judging whether the route is successfully opened, if yes, the service authentication and authorization is successful; otherwise, the service authentication and authorization fails.

2. The method according to claim 1, wherein the first service establishing request is sent by the user terminal in the WLAN to the service resolving unit according to an IP address of the service resolving unit; and the IP address of the service resolving unit is any one of:
   a local network address or a public IP address of the service resolving unit obtained through a private Domain Name Server (DNS) resolution;
   the public IP address of the service resolving unit obtained through a public network DNS resolution;
   a preconfigured IP address or any address in a preconfigured IP address list; and
   an IP address previously obtained by resolution in the last access.

3. The method according to claim 1, wherein the user subscription information comprises at least a user identity of the user terminal and a service name of the selected service requested by the user terminal.

4. The method according to claim 3, wherein the user identity is a Network Access Identity (NAI), or user IP, or International Mobile Subscriber Identity (IMSI), or TEMP ID, or Session Initialization Protocol-Uniform Resource Locator (SIP-URL) Identity of the user terminal.

5. The method according to claim 1, wherein the service establishing request is contained in a signaling of tunnel establishing request.

6. The method according to claim 1, wherein the service resolving unit is set in a visited network or in the home network of the user terminal.

7. The method according to claim 1, wherein the service authentication authorization unit is an Authentication Authorization and Accounting (AAA) server.

8. The method according to claim 7, wherein the service authentication authorization unit is a 3GPP AAA Server.

9. The method according to claim 1, wherein the destination device authorized to process the selected service is a Packet Data Gateway (PDG) as defined by the 3GPP standard or is a General Package Radio Service (GPRS) Gateway Support Node (GGSN).

10. The method according to claim 1, further comprising: after the selected service is successfully accessed, a corresponding relationship between a service name of the selected service and the address of the destination device authorized to process the selected service is stored by the user terminal.

11. The method according to claim 1, further comprising: after the selected service is successfully accessed a corresponding relationship between a service name of the selected service and the service resolving unit is stored by the user terminal.

12. The method according to claim 1, further comprising: after the access to the current selected service is over, the route between the WLAN access gateway device and the authorized destination device provided for the user terminal is closed.

13. The method according to claim 1, wherein the WLAN access gateway device is a WLAN Access Gateway (WAG).

14. The method according to claim 13, wherein the user identity is a Network Access Identity (NAI), or user IP, or International Mobile Subscriber Identity (IMSI), or TEMP ID, or Session Initialization Protocol-Uniform Resource Locator (SIP-URL) Identity of the WLAN user terminal.

15. The method according to claim 1, wherein said step c further comprises: while returning the failure information to the user terminal, indicating, by the service authentication authorization unit, an appropriate error information to the user terminal that initiates the request.

16. An apparatus for resolving and accessing a selected service in a cellular-Wireless Local Area Network (WLAN) interworking network, wherein a service resolving unit is configured in the cellular network for initial access processing; the apparatus being adapted to process initial access in the cellular network;

receive a service authentication and authorization request from the service resolving unit; wherein the authentication and authorization request contains subscription information extracted by the service resolving unit from a first service establishing request sent by a user terminal in the WLAN;

perform service authentication and authorization to the user terminal according to the subscription information;

determine whether a route between the current authorized destination device and a WLAN access gateway device serving the WLAN user terminal that initiates the request is opened to the user terminal, if the route is opened, the service authentication and authorization is successful; otherwise, send an open route notification to the WLAN access gateway device to instruct the WLAN access gateway device to open the route to the authorized destination device; then judge whether the route is successfully opened, if yes, the service authentication and authorization is successful; otherwise, the service authentication and authorization fails;

return an address of a destination device authorized to process the selected service to the user terminal via the service resolving unit if the authentication and authorization is successful, wherein the address is used to establish a service connection between the user terminal and the destination device; and return failure information to the user terminal via the service resolving unit if the authentication and authorization fails;

while returning the address of the destination device authorized to process the selected service to the user terminal, the service authentication authorization unit sending a service authorization notification that carries information of the user terminal to the destination device; the user terminal sending a second service establishing request to the destination device; after receiving the second service establishing request, the destination device performing authentication and authorization to the user terminal according to the information in the service authorization notification, if the authentication is successful, the destination device establishing the service connection with the user terminal.

* * * * *